US006313346B1

(12) United States Patent
Chen et al.

(10) Patent No.: US 6,313,346 B1
(45) Date of Patent: Nov. 6, 2001

(54) CATALYST COMPOSITIONS FOR THE PRODUCTION OF POLYURETHANES

(75) Inventors: Ning Chen, Jamison; Richard Paul Underwood, Allentown; Mark Leo Listemann, Kutztown, all of PA (US)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 09/276,963

(22) Filed: Mar. 26, 1999

(51) Int. Cl.[7] ...................... C07C 233/02; C07C 233/05; C07C 233/08; C07D 295/04; C07D 453/02

(52) U.S. Cl. .......................... 564/123; 502/167; 502/200; 564/188; 564/191; 564/193; 564/197; 564/198; 546/133; 546/137; 546/184; 546/242; 546/248

(58) Field of Search .................................... 502/167, 200; 564/123, 188, 191, 193, 197, 198; 546/133, 137, 184, 242, 248

(56) References Cited

U.S. PATENT DOCUMENTS

| | | | |
|---|---|---|---|
| 3,073,787 | 1/1963 | Krakler | 521/115 |
| 4,007,140 | 2/1977 | Ibbotson | 521/164 |
| 4,094,827 | 6/1978 | McEntire | 521/129 |
| 4,194,069 | 3/1980 | Speranza et al. | 521/129 |
| 4,248,930 | 2/1981 | Haas et al. | 428/315 |
| 4,252,819 * | 2/1981 | Hirata et al. | 424/285 |
| 4,644,017 | 2/1987 | Haas et al. | 521/129 |
| 5,824,711 | 10/1998 | Kimock et al. | 521/129 |
| 5,874,483 | 2/1999 | Savoca et al. | 521/115 |

FOREIGN PATENT DOCUMENTS

| | | |
|---|---|---|
| 3027796 | 2/1982 | (DE) . |
| 799821 | 10/1997 | (EP) . |
| 54-44660 * | 4/1979 | (JP) . |
| 63-303960 * | 12/1988 | (JP) . |
| 9-309879 * | 12/1997 | (JP) . |
| 96-36608 * | 11/1996 | (WO) . |

OTHER PUBLICATIONS

Shchaveleva et al.; *Compounds related to acyclovir. V. Synthesis and antiviral activity of carbethoxyalkoxymethyl derivatives of nucleoside bases*; Bioorg. Khim. (1989), 15(7), 960–8.*

* cited by examiner

*Primary Examiner*—Rabon Sergent
(74) *Attorney, Agent, or Firm*—Mary E. Bongiorno

(57) ABSTRACT

A composition having the formula:

$$R-O-CH_2CH_2-C(=O)-NH_2$$

wherein R is a linear alkyl, branched alkyl, cycloalkyl, polycyclic alkyl, alkylaminoalkyl, or alkyloxyalkyl group having 1 to 20 carbon atoms and at least one primary, secondary, or tertiary amino functional group. The composition is effective as a catalyst in the production of polyurethanes.

3 Claims, No Drawings

CATALYST COMPOSITIONS FOR THE PRODUCTION OF POLYURETHANES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Polyurethanes are useful in a variety of applications. For example, polyurethane elastomers are used in automotive parts, shoe soles, and other products in which toughness, flexibility, strength, abrasion resistance, and shock-absorbing properties are required. Polyurethanes are also used in coatings and in flexible and rigid foams.

Polyurethanes, in general, are produced by the reaction of a polyisocyanate and a polyol in the presence of a catalyst. The catalyst is typically a low molecular weight tertiary amine such as triethylenediamine.

Polyurethane foams are produced through the reaction of a polyisocyanate with a polyol in the presence of various additives. One class of additives which is particularly effective as blowing agents is the chlorofluorocarbons (CFCs). CFCs vaporize as a result of the reaction exotherm during polymerization and cause the polymerizing mass to form a foam. However, the discovery that CFCs deplete ozone in the stratosphere has resulted in mandates for restricting CFC use. Therefore, more efforts have gone into the development of alternatives to CFCs for forming urethane foams and water blowing has emerged as an important altemative. In this method, blowing occurs from carbon dioxide generated by the reaction of water with the polyisocyanate. Foams can be formed by a one-shot method or by formation of a prepolymer and subsequent reaction of the prepolymer with water in the presence of a catalyst to form the foam. Regardless of the method, a balance is needed between reaction of the isocyanate and the polyol (gelling) and the reaction of the isocyanate with water (blowing) in order to produce a polyurethane foam in which the cells are relatively uniform and the foam has specific properties depending on the anticipated application; for example, rigid foams, semi-rigid foams, and flexible foams.

The ability of the catalyst to selectively promote either blowing or gelling is an important consideration in selecting a catalyst for the production of a polyurethane foam with specific properties. If a catalyst promotes the blowing reaction to too high a degree, carbon dioxide will be evolved before sufficient reaction of isocyanate with polyol has occurred. The carbon dioxide will bubble out of the formulation, resulting in collapse of the foam and production of a poor quality foam. At the opposite extreme, if a catalyst promotes the gelling reaction too strongly, a substantial portion of the carbon dioxide will be evolved after a significant degree of polymerization has occurred. Again, a poor quality foam is produced; characterized by high density, broken or poorly defined cells, or other undesirable features. Frequently, a gelling catalyst and a blowing catalyst are used together to achieve the desired balance of gelling and blowing in the foam.

Tertiary amine catalysts have been used to in the production of polyurethanes. The tertiary amine catalysts accelerate both blowing (reaction of water with isocyanate to generate carbon dioxide) and gelling (reaction of polyol with isocyanate) and have been shown to be effective in balancing the blowing and gelling reactions to produce a desirable product. However, typical tertiary amines used as catalysts for polyurethane production generally have offensive odors and many are highly volatile due to low molecular weight. Release of tertiary amines during polyurethane production may present significant safety and toxicity problems, and release of residual amines from consumer products is generally undesirable.

Various alternatives to low molecular weight tertiary amine catalysts have been reported in the prior art. Examples are described below:

U.S. Pat. No. 3,073,787 (Krakler, 1963) discloses an improved process for preparing isocyanate foams in which a 3-dialkylaminopropionamide and 2-dialkylaminoacetamide are used as catalysts.

U.S. Pat. No. 4,007,140 (Ibbotson, 1977) discloses the use of various tertiary amines such as N,N'-bis(3-dimethylaminopropylamino)urea as low odor catalysts for the manufacture of polyurethanes.

U.S. Pat. No. 4,094,827 (McEntire, 1978) discloses the use of certain alkyl substituted ureas, such as N,N-bis (dimethylaminopropyl)urea, as catalysts in the production of polyurethane foam.

U.S. Pat. No. 4,194,069 (Speranza et al., 1980) discloses the use of N-(3-dimethylaminopropyl)-N'-(3-morpholinopropyl)urea as a catalyst for producing polyurethanes.

U.S. Pat. No. 4,248,930 (Haas et al., 1981) discloses new tertiary amine compounds, such as bis(dimethylamino-n-propyl)amine, as catalysts for the production of cellular or non-cellular polyurethane resins.

U.S. Pat. No. 4,644,017 (Haas et al., 1987) discloses the use of diffusion stable amino alkyl ureas having tertiary amino groups in the production of a polyisocyanate addition product.

DE 3027796 (1982) (Derwent abstract 82-13914E) discloses the use of dialkyl aminoalkyl urea catalysts for the production of polyurethane foam. It is reported that no smell is generated at polyurethane preparation temperatures.

EP 799,821 (1997) discloses aminelamide catalysts, such as 3-[3-dimethylaminopropyl]amino-N,N-dimethylpropanamide and 3-[3-dimethylaminopropyl] amino-N-[3-dimethylaminopropyl]propanamide, for the formation of polyurethanes. The catalysts have low fugitivity due to their reactivity with isocyanates.

U.S. 5,824,711 (Kimock et al., 1998) discloses N,N,N'-trimethylbis(aminoethyl)ether substituted urea compositions for the production of polyurethanes.

U.S. 5,874,483 (Savoca et al., 1999) discloses aminopropylbis(aminoethyl)ether compositions for the production of polyurethanes.

BRIEF SUMMARY OF THE INVENTION

The present invention is directed to new compositions which are useful for catalyzing the reaction between an organic polyisocyanate and a compound containing a reactive hydrogen to form polyurethanes. The compositions have been found to be especially effective catalysts for the blowing reaction, in which an organic polyisocyanate reacts with water, and the gelling reaction, in which an organic polyisocyanate reacts with a polyol. The catalyst composition is represented by the formula below:

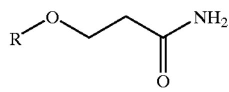

wherein R is a linear alkyl, branched alkyl, cycloalkyl, polycyclic alkyl, alkylaminoalkyl, or alkyloxyalkyl group having 1 to about 20 carbon atoms and at least one primary, secondary, or tertiary amino functional group, preferably a tertiary amino group. The invention is also directed to a process for producing polyurethanes using the new catalyst composition.

These novel catalysts are shown to have unexpectedly high activity and good blowing or gelling selectivity, depending upon the structure. The presence of an amide group in the compounds causes the catalysts to be bound to the urethane during the reaction and thus they are not released from the finished product. The above properties make these materials useful for the production of polyurethanes, especially polyurethane foams.

DETAILED DESCRIPTION OF THE INVENTION

The compounds of formula I are prepared by the nucleophilic addition of hydroxyl functional amine to an acrylamide. Hydroxyl functional amine and acrylamide are present in the reaction mixture in molar ratio of from about 1:10 to about 20:1, and preferably at a ratio of 1 to 2 moles hydroxyl functional amine per equivalent of acrylamide. Air is used to saturate the reaction mixture in order to inhibit the free radical polymerization of acrylamide. The reaction is preferably carried out at atmospheric pressure.

The reaction is conducted in the presence of base catalysts such as alkali or alkaline earth metal hydrides, hydroxides, or alkoxides. Other useful catalysts include aryl- and alkyllithium, potassium and sodium, tertiary amines, and metal amides. The catalyst is present in the reaction mixture in an amount between about 0.00005 and about 5 wt. %, and preferably between 0.0005 and 0.001 wt. %. of the total weight of the reactants.

The reaction can be carried out at a temperature from 0 to 100° C., preferably from 30 to 80° C. The reaction is allowed to run for 0.1 to 100 hours, preferably for 2 to 6 hours.

In principle, the reagent monomer can be reacted in batch fashion, via staged addition, or continuously. Synthesis is advantageously performed in a mixture of the neat monomers, however, an inert solvent for both reactants may be employed. Examples of suitable solvents are amides, halogenated hydrocarbons, esters, and ethers, preferred solvents are ethers.

A wide range of hydroxyl functional amines are potentially useful as a co-reactant with acrylamide. Examples of these compounds include 1-piperidineethanol, 1-methyl-2-piperidinemethanol, 3hydroxyl-1-methylpiperidine, 3-quinuclidinol, 4-hydroxy-1 -methylpiperidine, 1,3-bis (dimethylamino)-2-propanol, 1-dimethylamino-2-propanol, 1-diethylamino-2-propanol, and 3-dimethylamino-1-propanol.

The catalyst compositions according to the invention can catalyze (1) the reaction between an isocyanate functionality and an active hydrogen-containing compound, such as, an alcohol, a polyol, an amine or water; especially the gelling reaction of polyols with isocyanate to make polyurethanes and the blowing reaction of water with isocyanate to release carbon dioxide for making foamed polyurethanes, and (2) the trimerization of an isocyanate functionality to form polyisocyanurates.

The polyurethane products are prepared using any suitable organic polyisocyanates well known in the art including, for example, hexamethylene diisocyanate, phenylene diisocyanate, toluene diisocyanate (TDI) and 4,4'-diphenylmethane diisocyanate (MDI). Especially suitable are the 2, 4- and 2, 6-TDI's individually or together as their commercially available mixtures. Other suitable isocyanates are mixtures of diisocyanates known commercially as "crude MDI", also known as PAPI, which contain about 60% of 4, 4'-diphenylmethane diisocyanate along with other isomeric and analogous higher polyisocyanates. Also suitable are "prepolymers" of these polyisocyanates comprising a partially prereacted mixture of a polyisocyanate and a polyether or polyester polyol.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1, 3-butane diol, 1, 4-butane diol, 1, 6-hexane diol, neopentyl glycol, diethylene glycol, dipropylene glycol, pentaerythritol, glycerol, diglycerol, trimethylol propane and similar low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the loadbearing requirements, polymer polyols may comprise 20–80% of the polyol portion of the masterbatch.

Other typical agents found in the polyurethane foam formulations include chain extenders such as ethylene glycol and butanediol; crosslinkers such as diethanolamine, diisopropanolamine, triethanolamine and tripropanolamine; blowing agents such as water, methylene chloride, trichlorofluoromethane, and the like; and cell stabilizers such as silicones.

A catalytically effective amount of the catalyst composition is used in the polyurethane formulation. Suitable amounts of the catalyst composition may range from about 0.01 to 10 parts per 100 hundred parts polyol (phpp). Preferred amounts range from 0.05 to 1.0 phpp.

The catalyst composition may be used in combination with other tertiary amine, organotin and carboxylate urethane catalysts well known in the urethane art. For example, suitable gelling catalysts include but are not limited to trimethylamine, triethylamine, tributyl-amine, trioctylamine, diethyl cyclohexylamine, N-methylmorpholine, N-ethylmorpholine, N-octadecylmorpholine (N-cocomorpholine), N-methyidiethanolamine, N,N-dimethylethanolamine, N,N'-bis(2-hydroxypropyl)piperazine, N,N,N',N'-tetramethylethylene-iamine, N,N,N',N'-tetramethyl-1 ,3-propanediamine, trethylenediamine (1,4-diaza-bicyclo [2.2.2]octane), 1,8-diazabicyclo(5.4.0)undecene-7, 1,4-bis (2-hydroxypropyl)-2-methylpiperazine, N,N'-dimethylbenzylamine, N,N-dimethylcyclohexylamine, benzyltriethylammonium bromide, bis(N,N-diethylaminoethyl)adipate, N,N-diethylbenzylamine, N-ethylhexamethyleneamine, N-ethylpiperidine, alpha-methylbenzyldimethylamine, dimethylhexadecylamine, dimethylcetylamine, and the like. Suitable blowing catalysts include but are not limited to bis(dimethylaminoethyl)ether, pentamethyldiethylenetriamine, 2-[N-(dimethylaminoethoxyethyl)-N-methylamino]ethanol, and the like.

Following is a general polyurethane flexible foam formulation having a 1–3 lb/ft$^3$ (16–48 kg/m$^3$) density (e.g., foams used in automotive seating) containing a catalyst such as the catalyst composition according to the invention:

| Component | Parts by Weight |
|---|---|
| Polyol | 20–100 |
| Polymer Polyol | 80–0 |
| Silicone Surfactant | 1–2.5 |
| Blowing Agent (e.g., water) | 2–4.5 |
| Crossslinker | 0.5–2 |
| Catalyst | 0.2–2 |
| Isocyanate Index | 70–115* |

*Isocyanate Index = (mole isocyanate/mole active hydrogen) × 100

The invention will be further clarified by a consideration of the following examples, which are intended to be purely exemplary of the invention.

EXAMPLE 1

Preparation of 3-{2-[(2-Dimethylamino ethyl) methylamino]ethoxy}propionamide

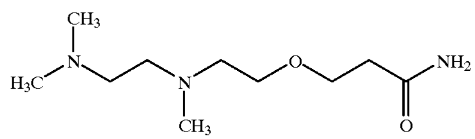

A 50 ml 3 neck round bottom flask was fitted with the following: magnetic stirrer, reflux condenser, air bubbler, and a temperature controlled oil bath. The flask was charged with 7.3 g of 2-{[2-(dimethylamino) ethyl] methylamino}ethanol. Sodium hydride, 0.014 g, was then added carefully to the of 2-{[2-(dimethylamino) ethyl] methylamino}ethanol with stirring. The mixture was stirred at a constant rate for two minutes before 3.55 g of acrylamide was added. After the addition of acrylamide, the reaction mixture was stirred at 50° C. for 6 hours. The mixture was cooled to ambient temperature. Concentrated sulfuric acid, 0.034 g, then was added to neutralize the product mixture. The resulting mixture was filtered through a Celite layer. The filtrate was collected for foam application. Quantitative $^1$H NMR showed that the product was 94% pure.

EXAMPLE 2

Preparation of 3-{2-{[2-(2-Dimethylamino ethoxy) ethyl]methylamino}ethoxy}propionamide

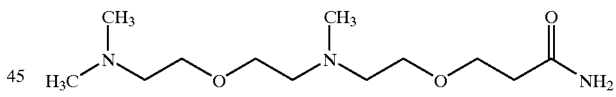

A 50 ml 3 neck round bottom flask was fitted with the following: magnetic stirrer, reflux condenser, air bubbler, and a temperature controlled oil bath. The flask was charged with 19.0 g of 2-{[2-(2-dimethylamino ethoxy)ethyl] methylamino}ethanol. Sodium hydride, 0.03 g, was then added carefully to the 2-{[2-(2-dimethylamino ethoxy) ethyl]methylamino}ethanol solution with stirring. The mixture was stirred at a constant rate for two minutes before 7.10 g of acrylamide was added. After the addition of acrylamide, the reaction mixture was stirred at 55° C. for 6 hours. The mixture was cooled to ambient temperature and neutralized with 0.80 g of concentrated sulfuric acid. The resulting mixture was filtered through a Celite layer. The filtrate was collected for foam application without further purification. Quantitative $^1$H NMR showed that the product was 94% pure.

EXAMPLE 3

Preparation of 3-[2-(Dimethylamino)ethoxy]propionamide

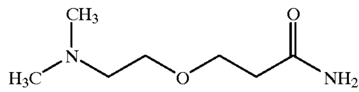

A 100 ml 3 neck round bottom flask was fitted with the following: magnetic stirrer, reflux condenser, air bubbler, and a temperature controlled oil bath. The flask was charged with 22.25 g of 2-dimethylamino ethanol. Sodium hydride, 0.05 g, was then added carefully to 2-dimethylamino ethanol solution with stirring. After stirring at a constant rate for two minutes, 17.75 g of acrylamide was added. The reaction mixture was stirred at 45° C. for 6 hours. The mixture was cooled to ambient temperature and neutralized with 0.11 g of concentrated sulfuric acid. The resulting mixture was filtered through a Celite layer. The filtrate was collected for foam application. Quantitative $^1$H NMR shows that the product had ~90% purity. The product could be further purified by reduced pressure distillation. Fraction collected at 135° C./1 mm Hg gives a colorless needle shape crystal (60% yield, >96% in purity).

EXAMPLE 4

Preparation of 3-{2-[(2-Dimethylamino)ethoxy]ethoxy}propionamide

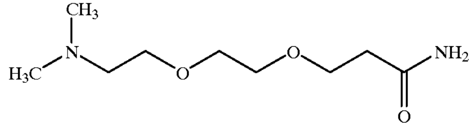

A 100 ml 3 neck round bottom flask was fitted with the following: magnetic stirrer, reflux condenser, air bubbler, and a temperature controlled oil bath. The flask was charged with 26.6 g of 2-[2-(dimethylamino)ethoxy] ethanol. Sodium hydride, 0.05 g, was then added carefully of 2-[2-(dimethylamino)ethoxy] ethanol solution with stirring. After stirring at a constant rate for two minutes, 14.2 9 of acrylamide was added. The reaction mixture was stirred at 55° C. for 6 hours. The mixture was cooled to ambient temperature and neutralized with 0.11 g of concentrated sulfuric acid. The resulting mixture was filtered through a Celite layer. The product was purified by reduced pressure distillation. Fraction collected at 130° C./1 mm Hg gave a pale yellow liquid 29.5 g (72% yield, >96% in purity).

In the following examples polyurethane foams were prepared in a conventional manner using the following premix formulation:

Premix Formulation

| Component | Parts by Weight |
|---|---|
| E-648 (ethylene oxide tipped polyether polyol, marketed by Arco) | 60 |
| E-519 (styrene-acrylonitrile copolymer filled polyether polyol, marketed by Arco) | 40 |
| Dabco ® DC-5043 (silicone surfactant marketed by Air Products and Chemicals, Inc.) | 1.5 |
| Diethanolamine | 1.75 |
| Water | 3.25 |
| TDI 80 (mixture of 80 wt. % 2,4-TDI and 20 wt. % 2,6-TDI) | 105 (isocyanate index) |

For each foam, the catalyst was added to 202 g of the above premix in a 32 oz (951 ml) paper cup and the formulation was mixed for 20 seconds at 5000 RPM using an overhead stirrer fitted with a 2 inch (5.1 cm) diameter stirring paddle. Sufficient TDI 80 was added to make a 105 index foam [index=(mole isocyanate/mole active hydrogen)×100] and the formulation was mixed well for 5 seconds using the same overhead stirrer. The 32 oz. cup was dropped through a hole in the bottom of a 128 oz. (3804 ml) paper cup placed on a stand. The hole was sized to catch the lip of the 32 oz. cup. The total volume of the foam container was 160 oz. (4755 ml). Foams approximated this volume at the end of the foam forming process. Times to reach the top of the mixing cup (TOC1), the top of the 128 oz. cup (TOC2), and maximum foam height were recorded.

EXAMPLE 5

Preparation of foam using 3-{2-[(2-dimethylaminoethyl)methylamino]ethoxy}propionamide (example 1) as gelling catalyst

| Catalyst | TOC1 (sec.) | TOC2 (sec.) | Full Height (sec.) | Foam Height (mm) |
|---|---|---|---|---|
| 0.25 pphp DABCO 33LV[a]/0.10 pphp DABCO BL-11[b] | 12.74 | 44.02 | 127.27 | 409.05 |
| 0.33 pphp Example 1 catalyst/0.10 pphp DABCO BL-11 | 12.11 | 43.19 | 131.99 | 411.42 |

[a]gelling catalyst; 33 wt.% triethylene diamine in dipropylene glycol
[b]blowing catalyst; 70 wt.% Bis(N,N-dimethylaminoethyl) ether in dipropylene glycol.

EXAMPLE 6

Preparation of foam using 3-{2-{[2-(2-dimethylamino ethoxy)ethyl] methylamino}ethoxy}propionamide (example 2) as blowing catalyst

| Catalyst | TOC1 (sec.) | TOC2 (sec.) | Full Height (sec.) | Foam Height (mm) |
|---|---|---|---|---|
| 0.25 pphp DABCO 33LV/0.10 pphp DABCO BL-11 | 13.33 | 45.62 | 122.47 | 407.50 |
| 0.25 pphp DABCO 33LV/0.225 pphp Example 2 catalyst | 14.08 | 48.02 | 125.16 | 408.62 |

EXAMPLE 7

Preparation of foam using 3-[2-(dimethylamino) ethoxy]propionamide (example 3) as gelling catalyst

| Catalyst | TOC1 (sec.) | TOC2 (sec.) | Full Height (sec.) | Foam Height (mm) |
|---|---|---|---|---|
| 0.25 pphp DABCO 33LV/0.10 pphp DABCO BL-11 | 12.30 | 42.54 | 119.14 | 411.26 |
| 0.40 pphp Example 3 catalyst/0.10 pphp DABCO BL-11 | 11.27 | 42.13 | 129.53 | 408.95 |

EXAMPLE 8

Preparation of foam using 3-{2-[(2dimethylamino) ethoxy]ethoxy}propionamide (example 4) as gelling catalyst

| Catalyst | TOC1 (sec.) | TOC2 (sec.) | Full Height (sec.) | Foam Height (mm) |
|---|---|---|---|---|
| 0.25 pphp DABCO 33LV/0.10 pphp DABCO BL-11 | 12.30 | 42.54 | 119.14 | 411.26 |
| 0.36 pphp Example 4 catalyst/0.10 pphp DABCO BL-11 | 10.81 | 43.82 | 131.24 | 405.96 |

Examples 5 through 8 show that the compositions of this invention can be highly effective as either gelling or blowing catalysts.

What is claimed is:

1. A compound having the formula:

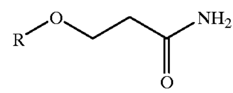

wherein R is a linear alkyl, branched alkyl, cycloalkyl, polycyclic alkyl, alkylaminoalkyl, or alkyloxyalkyl group and R is a residue of a hydroxyl functional amine and contains 1 to 20 carbon atoms and at least one primary, secondary, or tertiary amino functional group.

2. The compound of claim 1 wherein R has at least one tertiary amino functional group.

3. The compound of claim 1 wherein R is selected from the group consisting of 2-[(2-dimethylaminoethyl)-methylamino]ethyl, 2-{[2-(2-dimethylaminoethoxy)ethyl]-methylamino}ethyl, 2-(dimethylamino)ethyl, and 2-[(2-dimethylamino)ethoxy]-ethyl.

* * * * *